United States Patent
Kohlenberg et al.

(10) Patent No.: US 10,690,511 B2
(45) Date of Patent: Jun. 23, 2020

(54) TECHNOLOGIES FOR MANAGING SENSOR ANOMALIES

(71) Applicant: Intel Corporation, Santa Clara, CA (US)

(72) Inventors: Tobias M. Kohlenberg, Portland, OR (US); Brian D. Johnson, Portland, OR (US); John C. Weast, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 14/998,231

(22) Filed: Dec. 26, 2015

(65) Prior Publication Data

US 2017/0184416 A1  Jun. 29, 2017

(51) Int. Cl.
*G01D 3/08* (2006.01)
(52) U.S. Cl.
CPC ..................... *G01D 3/08* (2013.01)
(58) Field of Classification Search
USPC ........................................................ 702/182
See application file for complete search history.

(56) References Cited

U.S. PATENT DOCUMENTS

| | | | |
|---|---|---|---|
| 2001/0011359 A1* | 8/2001 | Kohler | G05B 9/03 714/48 |
| 2004/0181958 A1* | 9/2004 | Rodi | G01D 5/2492 33/706 |
| 2006/0287806 A1* | 12/2006 | Hori | F02D 41/222 701/114 |
| 2010/0299118 A1* | 11/2010 | Sharma | G05B 23/024 703/2 |
| 2012/0057017 A1 | 3/2012 | Kotula | |
| 2014/0149806 A1 | 5/2014 | Khalastchi et al. | |
| 2014/0297096 A1 | 10/2014 | Nanba et al. | |

OTHER PUBLICATIONS

International search report for PCT application No. PCT/US2016/063609, dated Mar. 7, 2017 (3 pages).
Written opinion for PCT application No. PCT/US2016/063609, dated Mar. 7, 2017 (6 pages).

* cited by examiner

*Primary Examiner* — Roy Y Yi
(74) *Attorney, Agent, or Firm* — Barnes & Thornburg LLP (57) ABSTRACT

Technologies for managing sensor anomalies in a compute system include determining whether sensor data received from a first sensor is anomalous based on sensor data from another sensor and a correlation rule. The correlation rule defines an excepted correlation between the first sensor data and the second sensor data. If the correlation between the first sensor data and the second sensor data is not observed, the first sensor data may be deemed anomalous. If so, the first sensor data may be verified using another sensor or other correlation. If the first sensor is determined to be malfunctioning, the compute system may mitigate the loss of the first sensor by using another sensor in its place.

17 Claims, 5 Drawing Sheets

TECHNOLOGIES FOR MANAGING SENSOR ANOMALIES

BACKGROUND

Sensors and sensing circuits are incorporated in an ever-growing number of electronic devices and computing systems. For example, in Internet of Things (IoT) applications, computing systems with hundreds or thousands of sensors are possible. A significant challenge in such systems is determining whether a particular sensor of the system is operating correctly. For example, under typical operating conditions, it can be difficult to discern whether unexpected sensor data is erroneous or merely anomalous. Many typical computing systems handle anomalous sensor data in a binary fashion. For example, a typical computing system may simply ignore sensor data that falls outside an expected range. Alternatively, some computing systems may rely on human operator verification of the anomalous sensor data. However, the delay in obtaining operator verification of the sensor data can causes undesirable performance in the computing system and/or simply be impractical under typical working conditions.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
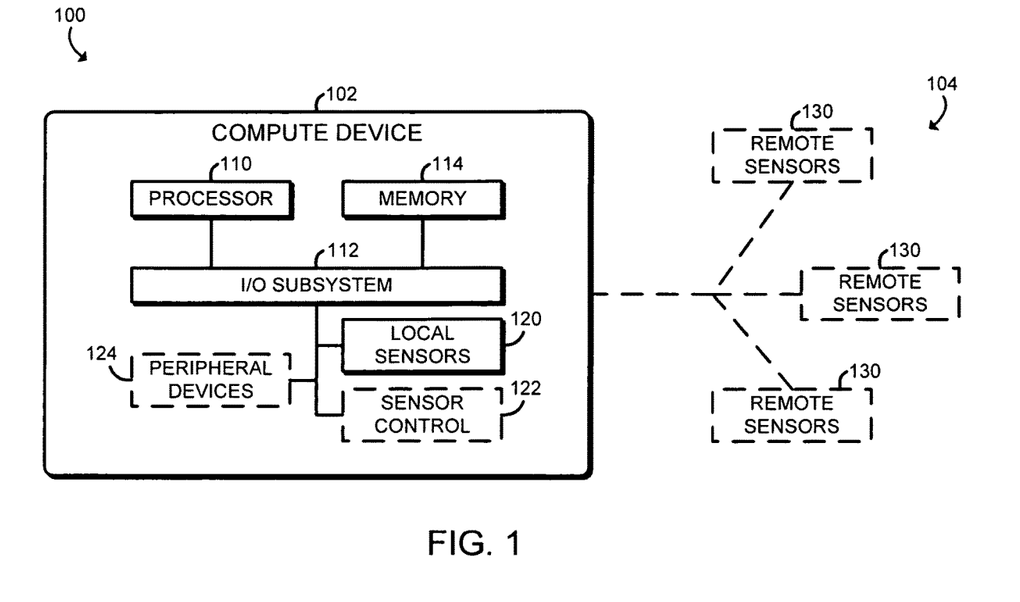
FIG. 1 is a simplified block diagram of at least one embodiment of a system for managing sensor anomalies.

Referring now to FIG. 1, in an illustrative embodiment, a compute system 100 for managing sensor anomalies includes a compute device 102 and, in some embodiments, a distributed sensor array 104. In use, as discussed in more detail below, the compute device 102 is configured to monitor sensor data produced by local sensors 120 of the compute device 102 and/or remote sensors 130 of the distributed sensor array 104 and determine whether any particular sensor data is anomalous (e.g., varies from an expected value or trend). To do so, the compute device 102 compares the sensor data in question to other sensor data produced by another sensor of the compute system 100 using a correlation rule. The correlation rule defines an expected relationship between the sensor data in question and the sensor data from the correlated sensor. For example, the correlation rule may define an expected change in the sensor data from the correlated sensor 120, 130 based on an observed change in the sensor data in question. If the sensor data in question indicates an unexpected measurement value or an unexpected change in a measurement value, the correlation rule may indicate that the sensor data from the correlated sensor 120, 130 should show a similar measurement or change (although, perhaps, of less magnitude or variance). Depending on the correlated sensors, the correlation rules may define relationships between two or more sensor data that ranges from a weak to a strong correlation. For example, in some embodiments, a correlation rule may define a general relationship (e.g., if sensor data from one sensor rises, sensor data from a correlated sensor should increase as well, but the amount of increase may not be known), while in other embodiments a correlation rule may define a specific mathematical relationship between sensor data.

Based on the observed sensor data and the associated correlation rule, the compute device 102 may better determine whether the sensor data in question is an accurate reading or is anomalous. However, even if the sensor data in question is determined to be anomalous (i.e., the observed sensor data does not comply with one or more associated correlation rules), such sensor data may still be accurate. For example, the sensor data may be indicative of a detected unexpected event, such as an unexpected temperature gradient sensed only by that one particular sensor. As such, the compute device 102 is further configured to verify the sensor data in question. To do so, the compute device 102 may utilize the same sensor 120, 130 and/or other sensors 120, 130 of the compute device 102. For example, the compute device 102 may obtain and/or analyze the sensor data in a different manner (e.g., increase the measurement frequency, increase the sensing resolution, etc.), analyze the sensor data trend (e.g., was there an abrupt change in measurements or is a gradual trend observable), relocate or reposition the sensor 120, 130 in question, move another sensor 120, 130 o the area or position of the sensor in question, and/or perform other actions to verify whether the sensor data in question is verifiable. If the compute device 102 determines that the sensor data is verified, the compute device 102 may utilize the sensor data as normal. If, however, the compute device 102 determines that the sensor data is not verified, the compute device 102 is configured to attempt to mitigate the loss of the corresponding sensor 120, 130 by, for example, relying on other sensors 120, 130 as discussed in more detail below.

The compute device 102 may be embodied as any type of compute device 102 configured to utilize multiple sensors during operation and perform the functions described herein. For example, the compute device 102 may be embodied as or otherwise include, without limitation, a computer, a server, a server system, an analysis compute device, a networking device, a multiprocessor system, a processor-based system, a consumer electronic device, a smartphone, a tablet computer, a notebook computer, a laptop computer, a desktop computer, a wearable computer, a smart accessory such as a smart watch or smart glasses, a messaging device, and/or any other computing device capable of utilizing various sensors. As shown in FIG. 1, the illustrative compute device 102 includes a processor 110, an I/O subsystem 112, a memory 114, and local sensors 120. Of course, the compute device 102 may include other or additional components, such as those commonly found in a computer device (e.g., various input/output devices), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. The processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the compute device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the compute device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processors 110, the memory 114, and other components of the compute device 102, on a single integrated circuit chip.

The local sensors 120 may be embodied as, or otherwise include, any type of sensor, sensing circuit, or sensor device capable of measuring or otherwise capturing data indicative of sensed stimulus. For example, the sensors 120 may include, but are not limited to, environmental sensors such as temperature or barometric pressure sensors, motion sensors such as accelerometers, biometric sensors such as hear rate sensors or galvanic skin response sensors, authentication sensors such as fingerprint scanner sensors, artificial sense sensors such as cameras or microphones, measurement sensors such as pressure or light sensors, and/or any other type of sensor capable of producing sensor data indicative of a sensed stimulus. Illustratively, the local sensors 120 are incorporated in the compute device 102. For example, in embodiments in which the components of the compute device 102 form a system-on-a-chip (SoC), the local sensors 120 may be included on the same die with the other components.

In some embodiments, the compute device 102 may also include one or more sensor controls 122. The sensor control(s) 122 may be embodied as any type of actuator or other mechanism capable of controlling an aspect of the local sensors 120 and/or the remote sensors 130 of the distributed sensor array 104. For example, in some embodiments, the sensor control 122 may be embodied as a motor or actuator capable of moving sensors 120, 130 (e.g., changing the location, orientation, and/or position of the sensors 120, 130). As discussed in more detail below, the sensor control(s) 122 may be used to verify anomalous data from a particular sensor 120, 130, as well as mitigate the loss of a sensor 120, 130 by repositioning another sensor in the place of the failing sensor 120, 130.

The compute device 102 may also include various peripheral devices 124 in some embodiments. The peripheral devices 124 may be embodied as, or otherwise include, any type of additional input/output devices, interface device, and/or other components and/or devices commonly found in a compute system. For example, in some embodiments, the peripheral devices 124 may include a touch screen, graphics circuitry, keyboard, mouse, speaker system, network interface, and/or other input/output devices, interface devices, and/or peripheral devices.

As discussed above, the distributed sensor array 104 includes one or more remote sensors 130 communicatively coupled to the compute device 102, but remote therefrom.

The remote sensors 130 may be similar to the local sensors 120 and be embodied as, or otherwise include, any type of any type of sensor, sensing circuit, or sensor device capable of measuring or otherwise capturing data indicative of sensed stimulus, such as those sensors discussed above in regard to the local sensors 120. In some embodiments, the remote sensors 130 may be movable relative to the compute device 102. However, in other embodiments, the remote sensors 130 may be fixed or stationary.

Figure 2:
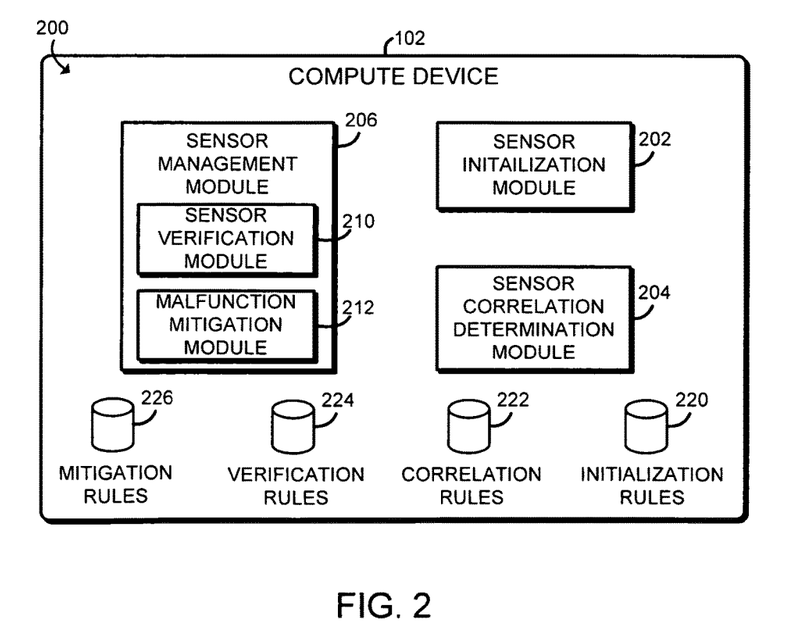
FIG. 2 is a simplified block diagram of at least one embodiment of an environment that may be established by a compute device of the system of FIG. 1.

Referring now to FIG. 2, in an illustrative embodiment, a compute device 102 establishes an environment 200 during operation. The illustrative environment 200 includes a sensor initialization module 202, a sensor correlation determination module 204, and a sensor management module 206. The various modules of the environment 200 may be embodied as hardware, firmware, software, or a combination thereof. As such, in some embodiments, one or more of the modules of the environment 200 may be embodied as circuitry or collection of electrical devices (e.g., a sensor initialization circuit 202, a sensor correlation determination circuit 204, and a sensor management circuit 206). It should be appreciated that, in such embodiments, one or more of the sensor initialization circuit 202, the sensor correlation determination circuit 204, and the sensor management circuit 206 may form a portion of one or more of the processor 110, the I/O subsystem 112, and/or other components of the compute device 102. Additionally, in some embodiments, one or more of the illustrative modules may form a portion of another module and/or one or more of the illustrative modules may be independent of one another. During use, the various modules of the environment 200 may generate and/or utilize various data including, but not limited to, initialization rules 220, correlation rules 222, verification rules 224, and mitigation rules 226 as discussed below.

The sensor initialization module 202 is configured to initialize the sensors 120, 130 of the system 100 to verify each sensor 120, 130 is operating correctly. To do so, the sensor initialization module 202 may utilize the initialization rules 220, which may define various operational characteristics for each sensor 120, 130. For example, the initialization rules 220 may define an acceptable or expected range of sensor data, the type of sensor data expected, electrical power levels for the sensors, and/or other operational characteristics. As such, the sensor initialization module 202 may utilize any suitable methodology, algorithm, and/or test to verify the operation of each sensor 120, 130. In some embodiments, the sensor initialization module 202 may be configured to request operator confirmation of the operational state of the sensors 120, 130 as discussed below.

The sensor correlation determination module 204 is configured to monitor the various sensor data produced by the sensors 120, 130 during normal operation and determine or generate correlation rules 222 based on the observed sensor data. As discussed above, each correlation rule 222 defines an expected relationship between two or more sensor data. The expected relationship can be simple (e.g., when one sensor data increases a correlated sensor data should increase as well) or very complex (e.g., a specific mathematical relationship between multiple sensor data). To generate the correlation rules 222, the sensor correlation determination module 204 may utilize any suitable methodology or algorithm. For example, in the illustrative embodiment, the sensor correlation determination module 204 is configured to utilize a machine learning algorithm. As such, in some embodiments, the sensor correlation determination module 204 is configured to monitor and analyze the sensor data produced by the sensors 120, 130 for some time during a training period (e.g., during an initialization phase of the system 100). Of course, as discussed below, the sensor correlation determination module 204 may also monitor sensor data during normal operation of the system 100 and update the correlation rules 222 over time based on observed correlations. Additionally, in some embodiments, one or more of the correlation rules 222 may be "hard-coded" or otherwise supplied by an operator or manufacturer of the system 100, rather than inferred or determined by the sensor correlation determination module 204 based on observed sensor data.

The sensor management module 206 is configured to monitor sensor data produced by the sensors 120, 130 during normal operation of the system 100 and determine whether any sensor data is anomalous. To do so, the sensor management module 206 is configured to compare the various sensor data to each other based on the correlation rules 222. That is, the sensor management module 206 determines whether any sensor data is unexpected (e.g., an unexpected value or trend) based on correlated sensor data from one or more other sensors 120, 130. As discussed above, the correlation rules 222 define an expected relationship between correlated sensor data. For example, the correlation rule 222 associated with a particular sensor 120, 130 may indicate that a change in the sensor data of that particular sensor 120, 130 should cause a similar change to be observed in the correlated sensor data (although the change in the correlated sensor data may have a different magnitude, direction, temporal offset, type, etc.). If the sensor management module 206 determines that the correlated sensor data does not show the expected correlated relationship with the sensor data in question, the sensor management module 206 may determine that the sensor data in question is anomalous.

However, even though the sensor management module 206 may determine particular sensor data is anomalous, that particular sensor data may still be valid (e.g., the reading may be a valid read, although unexpected or otherwise out of the norm). As such, the sensor management module 206 also includes a sensor verification module 210 configured to verify the sensor data obtained from the sensor 120, 130 in question. For example, if a particular sensor 120, 130 produces an unexpected reading that is not observed in correlated sensor data (e.g., even at an expected lesser magnitude), the sensor management module 206 is configured to verify whether the sensor data is accurate rather than simply discarding the sensor data as in typical compute systems. To do so, the sensor verification module 210 may utilize one or more of the verification rules 224. The verification rules 224 define rules, methods, and/or other data usable by the compute device 102 to verify whether a sensor 120, 130 is malfunctioning. For example, the verification rules 224 may define a different type of analysis to perform on the sensor data (e.g., increase the measurement frequency, increase the sensing resolution, analyzing visual data in a different spectrum, applying a different type of filter, etc.). Additionally or alternatively, the verification rules 224 may dictate that the historical trend of the sensor data should be analyzed to determine, for example, whether an unexpected change in the sensor data in question was abrupt or gradual over time. Further, in some embodiments, the verification rules 224 may define other sensors 120, 130 of the system 100 that may be used to verify the anomalous sensor data. For example, if the other sensors 120, 130 are not presently activated, the other sensors 120, 130 may be brought on-line or otherwise activated to sense the same stimulus as the anomalous sensor 120, 130. Additionally, in embodiments in which the compute device 102 includes the sensor control 122, the other sensors 120, 130 may be moved to the same area or location as the anomalous sensor 120, 130 to determine whether the same stimulus is sensed by the other sensor 120, 130. Additionally or alternatively, the sensor control 122 may be used to control the anomalous sensor 120, 130 to reposition, rotate, or otherwise relocate the anomalous sensor 120, 130 in an effort to validate the anomalous sensor data (e.g., by determining whether the anomalous sensor data is produced regardless of the location of the corresponding sensor 120, 130). The verification rules 224 may be hard-coded into the compute device 102 or learned over time using, for example, a machine learning algorithm.

If the sensor management module 206 is able to verify that the anomalous sensor data is accurate, that sensor data may be used by the compute device 102 as normal. Additionally, in some embodiments, the sensor correlation determination module 204 may update the correlation rules based on the observed anomalous, but verified, sensor data. Alternatively, if the sensor management module 206 is unable to verify the anomalous sensor data, the sensor management module 206 determines that the corresponding sensor 120, 130 is most likely malfunctioning. In response, the sensor management module 206 is configured to attempt to mitigate the loss of the corresponding sensor 120, 130. To do so, the sensor management module 206 includes a malfunction mitigation module 212. The malfunction mitigation module 212 is configured to mitigate the loss of a sensor 120, 130 by using another sensor 120, 130 of the system 100 according to the mitigation rules 226. The mitigation rules 226 indicate which other sensors 120, 130 of the system may be used to replace a particular failing sensor 120, 130. For example, the mitigation rules 226 may indicate that another pressure sensor of the system 100 may be used as a replacement for failing pressure sensor. To do so, the mitigation rules 226 may provide alternative sensor data analysis algorithms, settings, filters, and/or other sensor data processing to be applied to sensor data received from the operational sensors 120, 130 of the system 100 to mitigate the loss of the failing sensor 120, 130. For example, if a microphone of an array of microphones fails, the mitigation rules 226 may dictate that the compute device 102 should increase the sensitivity of the other microphones. In embodiments in which the compute device 102 includes the sensor control 122, the malfunction mitigation module 212 may be configured to relocate other sensors 120, 130 of the system 100 to mitigate the loss of the failing sensor 120, 130. In the illustrative example of a failing microphone, the malfunction mitigation module 212 may be configured to move or reposition the other microphones of the array, based on the mitigation rules 226, to accommodate the loss of the failing microphone.

Figure 3:
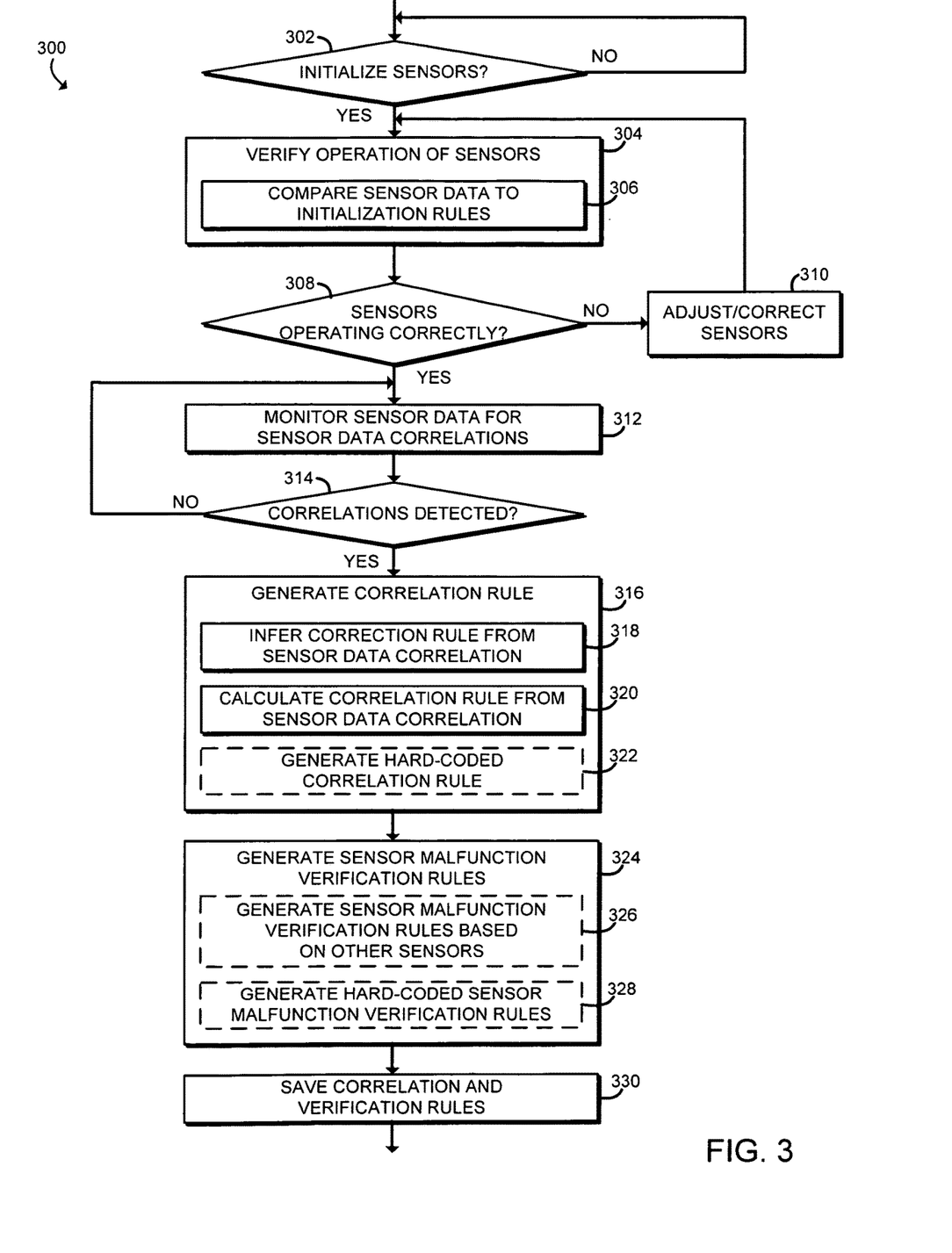
FIG. 3 is a simplified flow diagram of at least one embodiment of a method for initializing sensors that may be executed by the compute device of the system of FIGS. 1 and 2.

Referring now to FIG. 3, in use, the compute device 102 may execute a method 300 for initializing the sensors 120, 130 of the system 100. The method 300 begins with block 302 in which the compute device 102 determines whether to initialize the sensors 120, 130. For example, the sensors 120, 130 may be initialized upon every power up of the compute device 102 or initialized only during a training period as discussed below. If the sensors 120, 130 are to be initialized, the method 300 advances to block 304 in which the compute device 102 verifies the operation of each sensor 120, 130 of the system 100. To do so, as shown in block 306, the compute device 102 may compare observed sensor data to the initialization rules 220. As discussed above, the initialization rules 220 may define an acceptable or expected range of sensor data, the type of sensor data expected, electrical power levels for the sensors, and/or other operational characteristics. As such, the compute device 102 is configured to monitor such operational characteristics to ensure each sensor 120, 130 is operating correctly. In some embodiments, the compute device 102 may also rely on operator verification of the sensors 120, 130 in block 304.

In block 308, the compute device 102 determines whether each sensor 120, 130 of the system 100 was successfully verified. If not, the method 300 advances to block 310 in which the unverified or otherwise inoperable sensor(s) 120, 130 are adjusted or corrected. For example, malfunctioning sensors 120, 130 may be recalibrated or otherwise replaced with properly functioning sensors 120, 130 in block 310. The method 300 subsequently loops back to block 304 in which the compute device 102 continues to verify the proper operation of all sensors 120, 130 of the system 100.

Referring back to block 308, if the compute device 102 determines that each sensor 120, 130 of the system 100 are operating correctly (i.e., the compute device 102 has successfully verified each sensor 120, 130), the method 300 advances to block 312. In block 312, the compute device 102 monitors the sensor data produced by the verified sensors 120, 130 during operation to determine correlations between the various sensor data. The compute device 102 may monitor the sensor data from the sensors 120, 130 for any suitable amount of time required to identify the sensor data correlations depending on, for example, the number of sensors 120, 130 and the particular implementation. For example, in some embodiments, the compute device 102 monitors sensor data correlations during a training period of a machine learning algorithm.

The compute device 102 may utilize any suitable methodology to determine correlations between two or more sensor data. For example, in the illustrative embodiment, the compute device 102 is configured to determine that a correlation exists between two or more sensor data if the compute device 102 is able to identify some type of relationship between the observed sensor data. The identified relationship may be loose or general in nature. For example, the compute device 102 may identify a relationship between two sensors 120, 130 if sensor data from one sensor 120, 130 increases when sensor data from the correlated sensor 120, 130 decreases (or likewise increases). Additionally or alternatively, the identified relationship may be strict or exact in nature. For example, the compute device 102 may determine a mathematical relationship between sensor data from two or more sensors 120, 130. In such cases, the compute device 102 is capable of determining an expected change in sensor data from one sensor 120, 130 in response to a change in the sensor data from a correlated sensor 120, 130 based on the identified mathematical relationship. Of course, the compute device 102 may use other types of observations, calculations, algorithms, and/or methodologies to identify correlations between sensor data in other embodiments.

In block 314, the compute device 102 determines whether any correlations have been identified. If not, the method 300 loops back to block 312 in which the compute device 102 continues to monitor the sensor data produced by the sensors 120, 130 for correlations. If, however, the compute device 102 has identified one or more correlations in the observed sensor data, the method 300 advances to block 316. In block 316, the compute device 102 generates one or more correlation rules 222 based on the identified correlations. As discussed above, the correlation rules 222 define an expected relationship between sensor data from two or more sensors 120, 130 of the system 100. For example, a particular correlation rule 222 may define an expected change, trend, or measurement value in a correlated sensor data in response to an observed change, trend, or measurement value in the sensor data in question. Additionally, as discussed above, each correlation rule 222 may define a loose or strict (e.g., a mathematical) relationship.

The compute device 102 may utilize any suitable methodology, algorithm, or calculation to generate the correlation rules 222. For example, in block 318, the compute device 102 may infer a correlation rule 222 from observed correlations between sensor data of two or more sensor 120, 130. Such inferred correlation rules 222 may define, for example, loose or general relationships (e.g., when sensor data from a monitored sensor 120, 130 changes, the sensor data from correlated sensors 120, 130 should also change). Additionally or alternatively, the compute device 102 may calculate a correlation rule 222 based on the observed correlations between sensor data of two or more sensor 120, 130. Such calculated correlation rules 222 may define, for example, a particular mathematical relationship between the sensor data or two or more sensors 120, 130. Further, in some embodiments, the compute device 102 may generate hard-coded correlation rules 222 that define a particular relationship between sensor data of two or more sensors 120, 130. Such hard-coded correlation rules 222 may be provided by an operator or manufacturer of the compute device 102.

Figure 4:
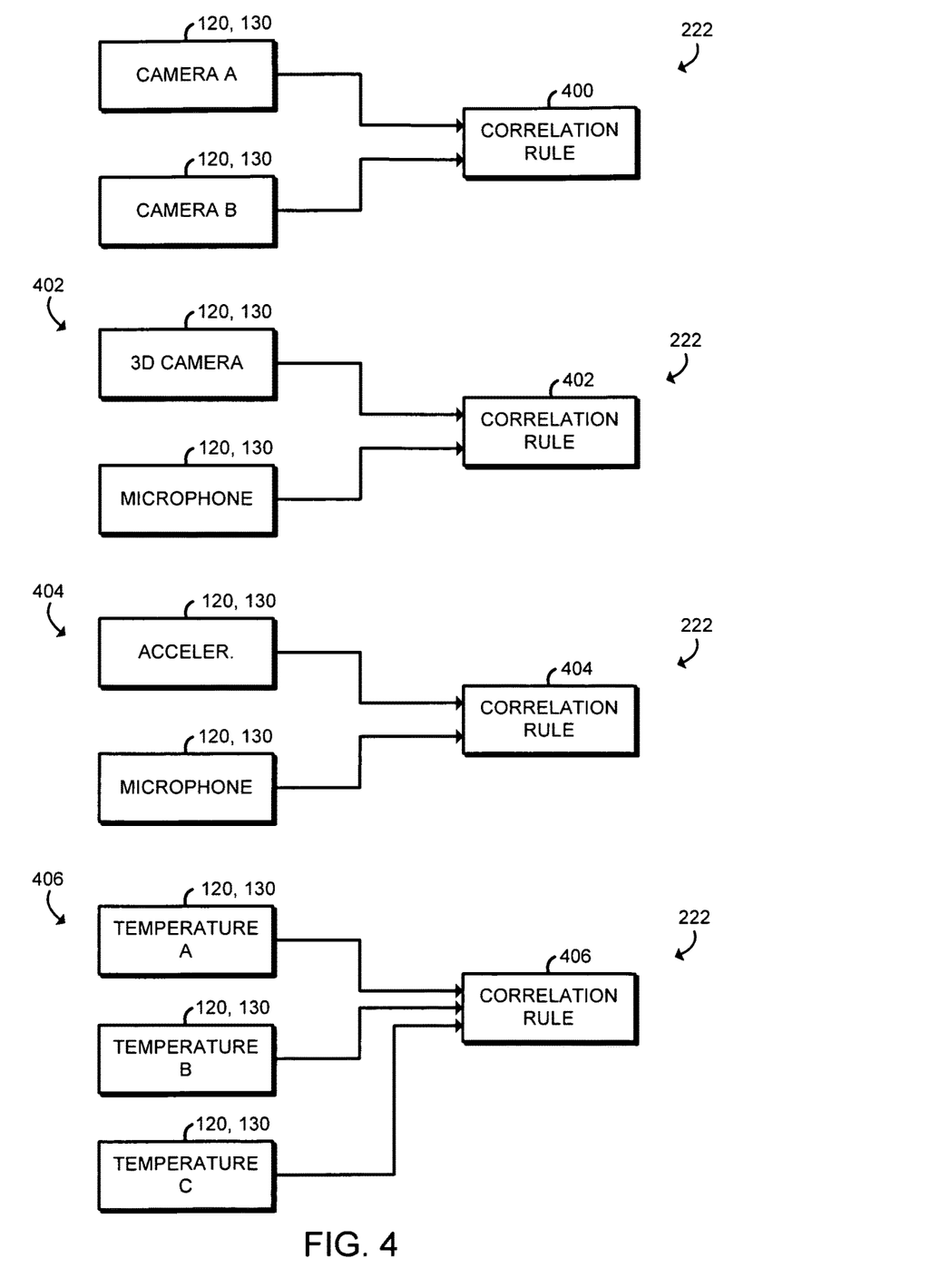
FIG. 4 is a simplified block diagram of various embodiments of correlation rules that may be generated by the method of claim 3.

As such, the compute device 102 is configured to generate or otherwise determine correlation rules 222 that define different types of relationships between sensor data of the sensors 120, 130 of the system 100 in block 316. Several example correlation rules 222 are shown in FIG. 4. In one example, a correlation rule 400 of the correlation rules 222 defines an expected relationship between sensor data produced by two cameras A and B of the sensors 120, 130. The correlation rule 400 may dictate, for example, that any motion detected in camera A should also be represented in camera B (e.g., when the two cameras A, B are monitoring the same area or location). As another example, a correlation rule 402 of the correlation rules 222 defines an expected relationship between a 3D camera and a microphone of the sensors 120, 130. The correlation rule 402 may dictate, for example, that as an entity depicted in 3D images produced by the 3D camera approaches the compute device 102, sound data produced by the microphone should increase in volume. As a further example, a correlation rule 404 of the correlation rules 222 defines an expected relationship between an accelerometer and a microphone of the sensors 120, 130. The correlation rule 404 may dictate, for example, that when the accelerometer detects movement, wind noise should be discernable in the sound data produced by the microphone. As yet another example, a correlation rule 406 of the correlation rules 222 defines an expected relationship between three temperature sensors A, B, C of sensors 120, 130. The correlation rule 406 may dictate, for example, that when the temperature sensor B detects an increase in temperature, the temperature sensors A and C should also detect an increase in temperature. The correlation rule 406 may further dictate that the increase in temperature sensed by the correlated temperature sensors 120, 130 be of a less magnitude and/or temporally delayed relative to the sensor data produced by the temperature sensor B. Of course, the correlation rules 400, 402, 404, 406 are simple examples of correlation rules 222 usable by the compute device 102. In other embodiments, other types of correlation rules 222 may be used as described in detail herein.

Referring back to FIG. 3, after the compute device 102 generated or determines the correlation rules 222 in block 316, the method 300 advances to block 324. In block 324, the compute device 102 determines or otherwise generates the verification rules 224. As discussed above, the verification rules 224 define rules or methods usable by the compute device 102 to verify a particular sensor 120, 130 is operating correctly. The verification rules may define, for example, different analysis methods that may be employed on anomalous sensor data to verify the sensor data, whether historical sensor data may be analyzed to verify the anomalous data, and/or other criteria or activities that may be utilized by the compute device 102 to verify the operation of a sensor 120, 130. For example, in some embodiments in block 326, the compute device 102 may generate or determine verification rules 224 that define which other sensors 120, 130 may be used to verify a sensor 120, 130 in question and how those other sensors 120, 130 may be used to do so. For example, the compute device 102 may identify other sensors 120, 130 of the system 100 that may be used to replace or "fact check" a particular sensor 120, 130 in question. Additionally or alternatively, in block 328, the compute device 102 may generate or determine hard-coded verification rules 224 usable by the compute device 102 to verify operation of a sensor 120, 130. Such hard-coded verification rules 224 may be provided by an operator or manufacturer of the compute device 102. Regardless, after the compute device 102 determines or generates the verification rules 224 in block 324, the method 300 advances to block 330 in which the compute device 102 stores the correlation rules 222 and the verification rules 224. For example, the compute device 102 may stores the rules 222, 224 in the memory 114 or a data storage of the compute device 102.

Figure 5:
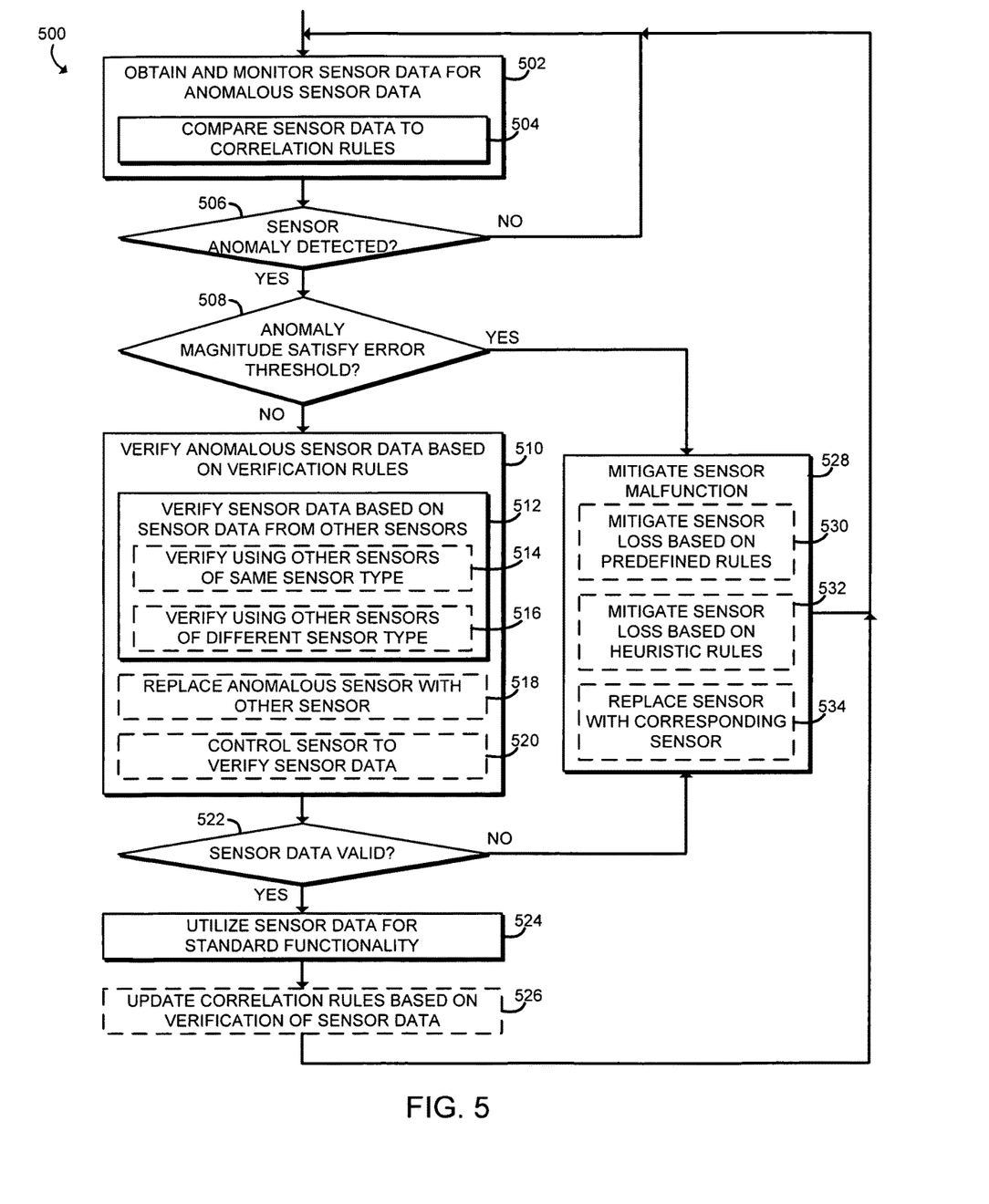
FIG. 5 is a simplified flow diagram of at least one embodiment of a method for managing sensor anomalies that may be executed of the compute device of the system of FIGS. 1 and 2.

Referring now to FIG. 5, in use, the compute device 102 may execute a method 500 for managing sensor anomalies. The method 500 begins with block 502 in which the compute device 102 obtains and monitors sensor data produced by the various sensors 120, 130 of the system 100. More specifically, the compute device 102 monitors for anomalous sensor data (i.e., unexpected sensor data) produced by the sensors 120, 130. To do so, the compute device 102 compares the sensor data from the sensors 120, 130 with each other using the correlation rules 222. The compute device 102 is configured to identify sensor data as anomalous if the sensor data does not abide by, or otherwise violates, one or more correlation rules that correlate the particular sensor data to sensor data produced by other sensors 120, 130 of the system 100. As discussed above, the correlation rules 222 define an expected relationship between correlated sensor data. As such, if the compute device 102 observes sensor data that does not exhibit the expected relationship with other correlated sensor data, the compute device 102 may determine the observed sensor data is anomalous. For example, the compute device 102 may determine particular sensor data is anomalous if it exhibits a decrease in a measurement value while a correlated sensor does not exhibit a similar a decrease in its sensor data as dictated by an associated correlation rule 222. Additionally or alternatively, the compute device 102 may determine particular sensor data is anomalous if it does not match a mathematical relationship with other correlated sensor data as defined by an associated correlation rule 222.

In block 506, the compute device 102 determines whether any anomalous sensor data has been detected. If not, the method 500 loops back to block 502 in which the compute device 102 continues to monitor the sensor data produced by the sensors 120, 130. If, however, the compute device 102 detects anomalous sensor data, the method 500 advances to block 508. In block 508, the compute device 102 determines whether the anomalous sensor data satisfies a reference threshold. That is, in block 508, the compute device 102 determines whether the sensor data is unreliable, invalid, or otherwise erroneous. In the illustrative embodiment, the reference threshold, which may be embodied part of the initialization rule 220 and/or verification rule 224, may define a particular range limit of measurement values or minimum sensor data characteristics that must be present for the sensor data to be even potentially valid. For example, the reference threshold may define a maximum temperature that a temperature sensor can read, a requirement that a microphone detect some level of noise, a requirement that video sensor data have some type of image included in it, a minimum pressure that a pressure sensor can read, and so forth. As such, in block 508, the compute device 102 determines whether the anomalous sensor data is outside of, or otherwise violates, the reference threshold. If not, the method 500 advances to block 510.

In block 510, the compute device 102 verifies the anomalous sensor data using the verification rules 224. As discussed above, the verification rules 224 define rules, methods, and/or other data usable by the compute device 102 to verify a particular sensor 120, 130 is operating correctly. For example, in block 512, the compute device 102 may utilize the verification rules 224 to identify other sensors 120, 130 of the system 100 that may be used to verify anomalous sensor data produced by the sensor 120, 130 in question. To do so, in block 514, the compute device 102 may use other sensors 120, 130 of the same sensor type as the sensor 120, 130 producing the anomalous sensor data. For example, if the compute device 102 detects anomalous data from a microphone of the sensors 120, 130, the compute device 102 may check sensor data produced by another microphone of the sensors 120, 130 to verify whether the anomalous data is accurate or invalid (e.g., unreliable or even erroneous) sensor data. Alternatively, in block 516, the compute device 102 may use other sensors 120, 130 of a different sensor type than the sensor 120, 130 producing the anomalous sensor data. For example, if the compute device 102 detects anomalous data from a pressure sensor of the sensors 120, 130, the compute device 102 may check image data produced by camera of the sensors 120, 130 to determine whether the anomalous data is accurate or invalid sensor data (e.g., by identifying a source or reason in the image for the pressure sensor to produce the anomalous data).

Figure 6:
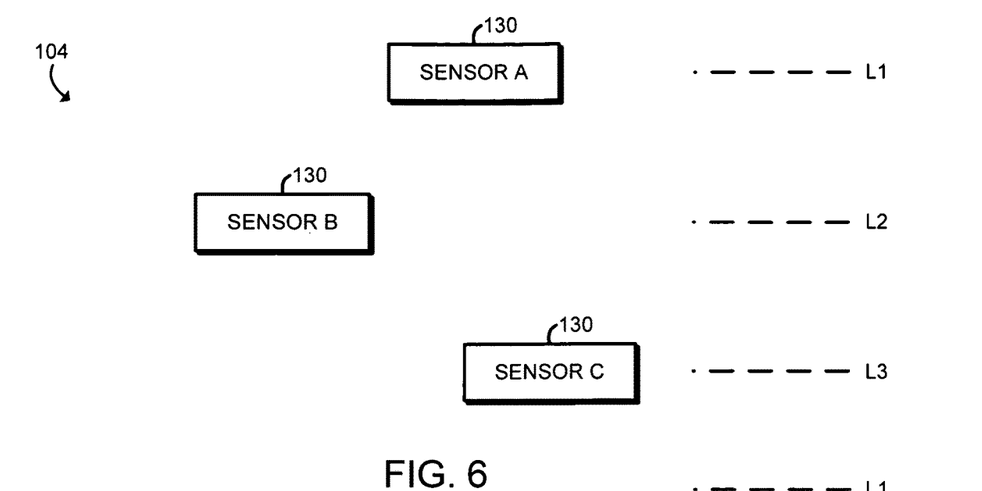
FIG. 6 is a simplified block diagram of at least one embodiment of a sensor array of the system of FIG. 1.
Figure 7:
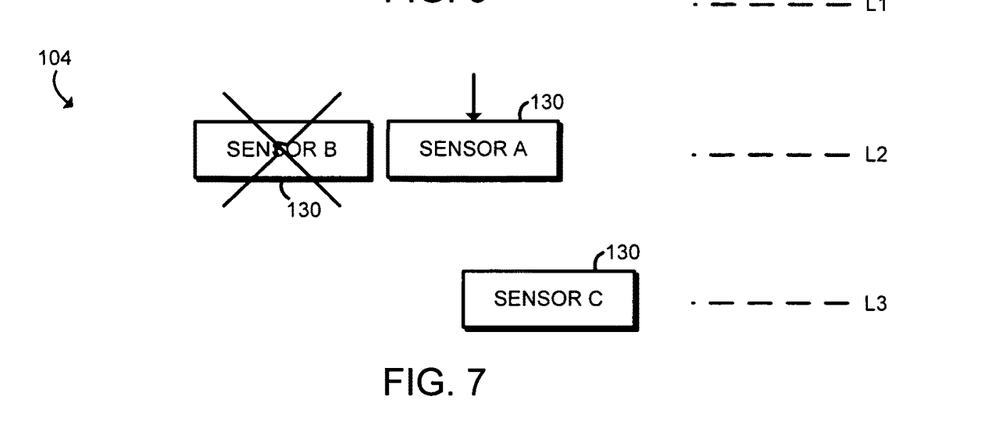
FIG. 7 is a simplified block diagram of the sensor array of FIG. 6 arranged in another configuration to verify a sensor anomaly during the execution of the method of FIG. 5.

In embodiments in which the compute device 102 includes the sensor control(s) 122, the compute device 102 may be configured to replace the sensor 120, 130 producing the anomalous data in block 518 and/or control the sensor 120, 130 producing the anomalous data in block 520 based on the verification rules 224. For example, as shown in FIG. 6, an embodiment of the distributed sensor array 104 is shown, which includes three remote sensors 130: sensor 130 (A), sensor 130 (B), and sensor (C). The sensor (A) 130 is located at a first level, L1. The sensor (B) 130 is located at a second level, L2, lower than the first level, L1. The, sensor (C) 130 is located at a third level, L3, lower than the second level, L3. At some point during operation of the system 100, the sensor (B) 130 produces anomalous sensor data. For example, the sensors 130 may be embodied as temperature sensors, and the sensor (B) 130 may measure a significantly high temperature at the second level, L2, which is not represented (even at a lower magnitude) in the correlated sensor data of the temperature sensor (A) 130 and the temperature sensor (B) 130. As such, to verify the sensor data produced by the sensor (B) 130, the compute device 102 may move the sensor (A) 130 from the first level, L1, to the second level, L2, using the sensor control(s) 122 as shown in FIG. 7. Once the sensor (A) 130 is located at the same level as the sensor (B) 130, the compute device 102 may determine whether the sensor (B) 130 also measures the abnormally high temperature. If so, the compute device 102 may determine that the sensor data produced by the sensor (B) 130, while anomalous, is accurate and the sensor (B) 130 is not malfunctioning. In a similar manner, the compute device 102 may simply reposition the sensor (B) 130 (e.g., to a different level) to determine whether the sensor (B) 130 measures a different temperature at the different level. If so, the sensor data produced by the sensor (B) 130 may be valid.

Referring back to FIG. 5, after the compute device 102 has verified the anomalous sensor data in block 510, the method 500 advances to block 522. In block 522, the compute device 102 determines whether the anomalous sensor data is valid based on the verification of block 510. If so, the method 500 advances to block 524 in which the compute device 102 utilizes the anomalous sensor data as normal for standard functionality of the system 100. Additionally, in some embodiments, the compute device 102 may update the correlation rules 222 in block 526 based on the verification of the anomalous sensor data in block 510. The method 500 subsequently loops back to block 502 in which the compute device 102 continues to monitor the sensor data produced by the sensors 120, 130.

Figure 8:
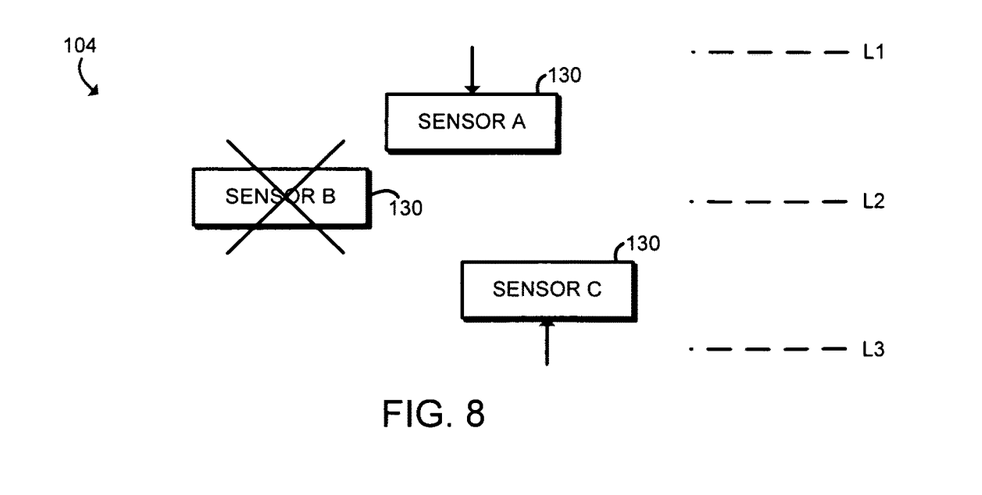
FIG. 8 is a simplified block diagram of the sensor array of FIG. 6 arranged in another configuration to mitigate a sensor malfunction during the execution of the method of FIG. 5.

If, however, the anomalous sensor data is greater or otherwise satisfies the reference error threshold in block 508 or if the anomalous sensor data is determined not to be valid in block 522, the method 500 advances to block 528. In block 528, the compute device 102 attempts to mitigate the loss of the sensor 120, 130 producing the anomalous sensor data based on the mitigation rules 226. For example, in block 530, the compute device 102 may mitigate the loss of the malfunctioning sensor 120, 130 based on one or more predefined rules included in the mitigation rules 226. Additionally or alternatively, the compute device 102 may mitigate the loss of the malfunctioning sensor 120, 130 based on a heuristic rule of the mitigation rules 226, which may be learned by the compute device 102 over time as discussed above. Further, in some embodiments, the compute device 102 may be configured to replace the malfunctioning sensor 120, 130 with another sensor 120, 130 of the system 100 based on the mitigation rules 226, which may identify which other sensors 120, 130 of the system 100 may be used in place of the malfunctioning sensor 120, 130. For example, referring back to the example of FIG. 6, the compute device 102 may be configured to mitigate the loss of the sensor (B) 130 by moving the sensor (A) 130 to a position between the first level, L1, and the second level, L2, and moving the sensor (C) 130 to a position between the second level, L2, and the third level, L3 as shown in FIG. 8. In those positions, the sensor (A) 130 and the sensor (C) 130 may be able to continue to adequately sense temperatures at all three levels, even with the loss of the sensor (B) 130.

Referring back to FIG. 5, after the compute device 102 has mitigated the loss of the malfunctioning sensor 120, 130, the method 500 loops back to block 502 in which the compute device 102 continues to monitor the sensor data produced by the sensors 120, 130 of the system 100. In this way, the compute device 102 is configured to monitor for anomalous sensor data, determine whether the anomalous sensor data is valid, and attempt to mitigate the loss of a malfunctioning sensor 120, 130 should the compute device 102 determine that the anomalous sensor data is not valid. As such, unlike typical sensing system in which anomalous sensor data may simply be ignored, the compute device 102 is configured to further analyze such data to determine whether the anomalous sensor data is valid or not.

Examples

Illustrative examples of the technologies disclosed herein are provided below. An embodiment of the technologies may include any one or more, and any combination of, the examples described below.

Example 1 includes a compute system for managing sensor anomalies of the compute system. The compute system includes a first sensor to generate first sensor data; a second sensor to generate second sensor data; a data storage to store a correlation rule, wherein the correlation rule defines an expected correlation between the first sensor data and the second sensor data; and a sensor management module to determine whether the first sensor data is anomalous based on the second sensor data and the correlation rule.

Example 2 includes the subject matter of Example 1, and wherein the first sensor is of a first sensor type and the second sensor is of a second sensor type different from the first sensor type.

Example 3 includes the subject matter of Examples 1 and 2, and wherein the correlation rule defines a relationship between the first sensor data and the second sensor data.

Example 4 includes the subject matter of Examples 1-3, and wherein the correlation rule defines a mathematical relationship between the first sensor data and the second sensor data.

Example 5 includes the subject matter of Examples 1-4, and wherein the correlation rule defines an expected change in the second sensor data based on a change in the first sensor data.

Example 6 includes the subject matter of Examples 1-5, and wherein the first sensor data is indicative of a measurement value and the correlation rule defines an expected measurement value of the second sensor data based on the measurement value of the first sensor data.

Example 7 includes the subject matter of Examples 1-6, and wherein the sensor management module is further to determine whether the first sensor is malfunctioning based on a comparison of the first sensor data to a reference threshold.

Example 8 includes the subject matter of Examples 1-7, and wherein the sensor management module is further to verify, in response to a determination that the first sensor is not malfunctioning, the first sensor data based on a verification rule, wherein the verification rule identifies another sensor useable to verify the first sensor data.

Example 9 includes the subject matter of Examples 1-8, and further comprising a third sensor to generate third sensor data, and wherein to verify the first sensor data comprises to verify the first sensor data based on the third sensor data.

Example 10 includes the subject matter of Examples 1-9, and wherein the third sensor is of a sensor type that is the same as a sensor type of the first sensor.

Example 11 includes the subject matter of Examples 1-10, and wherein the third sensor is of a sensor type that is different from a sensor type of the first sensor.

Example 12 includes the subject matter of Examples 1-11, and wherein to verify the first sensor data based on the third sensor data comprises to move the third sensor to an area occupied by the first sensor.

Example 13 includes the subject matter of Examples 1-12, and wherein to verify the first sensor data based on the third sensor data comprises to move the third sensor to a location previously occupied by the first sensor.

Example 14 includes the subject matter of Examples 1-13, and wherein the sensor management module is further to utilize the first sensor data in response to a successful verification of the first sensor data based on the verification rule.

Example 15 includes the subject matter of Examples 1-14, and wherein the first sensor is configured to sense a first characteristic, and further comprising a third sensor, wherein the sensor management module is further to utilize the third sensor to sense the first characteristic in place of the first sensor in response to a determination that the first sensor is malfunctioning.

Example 16 includes the subject matter of Examples 1-15, and wherein the sensor management module is further to select the third sensor based on a pre-defined mitigation rule that indicates the third sensor can be used to replace the first sensor.

Example 17 includes the subject matter of Examples 1-16, and wherein the sensor management module is further to select the third sensor based on a heuristic mitigation rule that indicates the third sensor can be used to replace the first sensor.

Example 18 includes the subject matter of Examples 1-17, and wherein the sensor management module is further to monitor the first sensor data and the second sensor data for a first time period; identify a correlation between the first sensor data and the second sensor data during the first time period; and determine the correlation rule based the identified correlation between the first sensor data and the second sensor data.

Example 19 includes the subject matter of Examples 1-18, and wherein the correlation rule defines a mathematical relationship between the first sensor data and the second sensor data.

Example 20 includes a method for managing sensor anomalies in a compute system. The method includes obtaining, by a compute device of the compute system, first sensor data from a first sensor of the compute system and second sensor data from a second sensor of the compute system; and determining, by the compute device, whether the first sensor data is anomalous based on the second sensor data and a correlation rule, wherein the correlation rule defines an expected correlation between the first sensor data and the second sensor data.

Example 21 includes the subject matter of Example 20, and wherein obtaining first sensor data and second sensor data comprises obtaining first sensor data from a first sensor of a first sensor type and obtaining second sensor data from a second sensor of a second sensor type different from the first sensor type.

Example 22 includes the subject matter of Examples 20 and 21, and wherein the correlation rule defines a relationship between the first sensor data and the second sensor data.

Example 23 includes the subject matter of Examples 20-22, and wherein the correlation rule defines a mathematical relationship between the first sensor data and the second sensor data.

Example 24 includes the subject matter of Examples 20-23, and wherein the correlation rule defines an expected change in the second sensor data based on a change in the first sensor data.

Example 25 includes the subject matter of Examples 20-24, and wherein the first sensor data is indicative of a measurement value and the correlation rule defines an expected measurement value of the second sensor data based on the measurement value of the first sensor data.

Example 26 includes the subject matter of Examples 20-25, and further comprising determining, by the compute device, whether the first sensor is malfunctioning by comparing the first sensor data to a reference threshold.

Example 27 includes the subject matter of Examples 20-26, and further comprising verifying, by the compute device and in response to a determination that the first sensor is not malfunctioning, the first sensor data based on a verification rule, wherein the verification rule identifies another sensor useable to verify the first sensor data.

Example 28 includes the subject matter of Examples 20-27, and wherein verifying the first sensor data comprises verifying the first sensor data based on third sensor data obtained from a third sensor.

Example 29 includes the subject matter of Examples 20-28, and wherein verifying the first sensor data based on the third sensor data comprises verifying the first sensor data based on third sensor data obtained from a third sensor of a sensor type that is the same as a sensor type of the first sensor.

Example 30 includes the subject matter of Examples 20-29, and wherein verifying the first sensor data based on the third sensor data comprises verifying the first sensor data based on third sensor data obtained from a third sensor of a sensor type that is different from a sensor type of the first sensor.

Example 31 includes the subject matter of Examples 20-30, and wherein verifying the first sensor data based on the third sensor data comprises moving the third sensor to an area occupied by the first sensor.

Example 32 includes the subject matter of Examples 20-31, and wherein verifying the first sensor data based on the third sensor data comprises moving the third sensor to a location previously occupied by the first sensor.

Example 33 includes the subject matter of Examples 20-32, and further comprising utilizing, by the compute device, the first sensor data in response to successfully verifying the first sensor data based on the verification rule.

Example 34 includes the subject matter of Examples 20-33, and wherein the first sensor is configured to sense a first characteristic, and further comprising utilizing, by the compute device, a third sensor to sense the first characteristic in place of the first sensor in response to a determination that the first sensor is malfunctioning.

Example 35 includes the subject matter of Examples 20-34, and further comprising selecting, by the compute device, the third sensor based on a pre-defined mitigation rule that indicates the third sensor can be used to replace the first sensor.

Example 36 includes the subject matter of Examples 20-35, and further comprising selecting, by the compute device, the third sensor based on a heuristic mitigation rule that indicates the third sensor can be used to replace the first sensor.

Example 37 includes the subject matter of Examples 20-36, and further comprising monitoring, by the compute device, the first sensor data and the second sensor data for a first time period; identifying, by the compute device, a correlation between the first sensor data and the second sensor data during the first time period; and determining, by the compute device, the correlation rule based the identified correlation between the first sensor data and the second sensor data.

Example 38 includes the subject matter of Examples 20-37, and wherein the correlation rule defines a mathematical relationship between the first sensor data and the second sensor data.

Example 39 includes one or more computer-readable storage media comprising a plurality of instructions that, when executed, cause a compute device to perform the method of any of Examples 20-38.

Example 40 includes a compute system for managing sensor anomalies of the compute system. The compute system includes means for obtaining first sensor data from a first sensor of the compute system and second sensor data from a second sensor of the compute system; and means for determining whether the first sensor data is anomalous based on the second sensor data and a correlation rule, wherein the correlation rule defines an expected correlation between the first sensor data and the second sensor data.

Example 41 includes the subject matter of Example 40, and wherein the means for obtaining first sensor data and second sensor data comprises means for obtaining first sensor data from a first sensor of a first sensor type and obtaining second sensor data from a second sensor of a second sensor type different from the first sensor type.

Example 42 includes the subject matter of Examples 40 or 41, and wherein the correlation rule defines a relationship between the first sensor data and the second sensor data.

Example 43 includes the subject matter of Examples 40-42, and wherein the correlation rule defines a mathematical relationship between the first sensor data and the second sensor data.

Example 44 includes the subject matter of Examples 40-43, and wherein the correlation rule defines an expected change in the second sensor data based on a change in the first sensor data.

Example 45 includes the subject matter of Examples 40-44, and wherein the first sensor data is indicative of a measurement value and the correlation rule defines an expected measurement value of the second sensor data based on the measurement value of the first sensor data.

Example 46 includes the subject matter of Examples 40-45, and further comprising means for determining whether the first sensor is malfunctioning by comparing the first sensor data to a reference threshold.

Example 47 includes the subject matter of Examples 40-46, and further comprising means for verifying, in response to a determination that the first sensor is not malfunctioning, the first sensor data based on a verification rule, wherein the verification rule identifies another sensor useable to verify the first sensor data.

Example 48 includes the subject matter of Examples 40-47, and wherein the means for verifying the first sensor data comprises means for verifying the first sensor data based on third sensor data obtained from a third sensor.

Example 49 includes the subject matter of Examples 40-48, and wherein the means for verifying the first sensor data based on the third sensor data comprises means for verifying the first sensor data based on third sensor data obtained from a third sensor of a sensor type that is the same as a sensor type of the first sensor.

Example 50 includes the subject matter of Examples 40-49, and wherein the means for verifying the first sensor data based on the third sensor data comprises means for verifying the first sensor data based on third sensor data obtained from a third sensor of a sensor type that is different from a sensor type of the first sensor.

Example 51 includes the subject matter of Examples 40-50, and wherein the means for verifying the first sensor data based on the third sensor data comprises means for moving the third sensor to an area occupied by the first sensor.

Example 52 includes the subject matter of Examples 40-51, and wherein the means for verifying the first sensor data based on the third sensor data comprises means for moving the third sensor to a location previously occupied by the first sensor.

Example 53 includes the subject matter of Examples 40-52, and further comprising means for utilizing the first sensor data in response to successfully verifying the first sensor data based on the verification rule.

Example 54 includes the subject matter of Examples 40-53, and wherein the first sensor is configured to sense a first characteristic, and further comprising means for utilizing a third sensor to sense the first characteristic in place of the first sensor in response to a determination that the first sensor is malfunctioning.

Example 55 includes the subject matter of Examples 40-54, and further comprising means for selecting the third sensor based on a pre-defined mitigation rule that indicates the third sensor can be used to replace the first sensor.

Example 56 includes the subject matter of Examples 40-55, and further comprising means for selecting the third sensor based on a heuristic mitigation rule that indicates the third sensor can be used to replace the first sensor.

Example 57 includes the subject matter of Examples 40-56, and further comprising means for monitoring the first sensor data and the second sensor data for a first time period; means for identifying a correlation between the first sensor data and the second sensor data during the first time period; and means for determining the correlation rule based the identified correlation between the first sensor data and the second sensor data.

Example 58 includes the subject matter of Examples 40-57, and wherein the correlation rule defines a mathematical relationship between the first sensor data and the second sensor data.

The invention claimed is:

1. A compute system for managing sensor anomalies of the compute system, the compute system comprising:
a first sensor to generate first sensor data;
a second sensor to generate second sensor data;
a data storage to store a correlation rule, wherein the correlation rule defines an expected correlation between the first sensor data and the second sensor data; and
a sensor management circuit to (i) determine whether the first sensor data is anomalous based on the second sensor data and the correlation rule, (ii) compare, in response to a determination that the first sensor data is anomalous based on the second sensor data and the correlation rule, the first sensor data to a reference threshold, (iii) determine whether the first sensor is malfunctioning based on the comparison of the first sensor data to the reference threshold, (iv) verify, in response to a determination that the first sensor is not malfunctioning, whether the first sensor data is valid based on a verification rule, wherein the verification rule identifies a third sensor useable to verify whether the first sensor data is valid and wherein to verify whether the first sensor data is valid comprises to verify whether the first sensor data is valid based on a comparison of the first sensor data to third sensor data generated by the third sensor, (v) in response to verification that the first sensor data is valid, utilize the first sensor data for standard functionality, and (vi) in response to no verification that the first sensor data is valid, utilize sensor data from another sensor in place of sensor data from the first sensor.

2. The compute system of claim 1, wherein the first sensor is of a first sensor type and the second sensor is of a second sensor type different from the first sensor type.

3. The compute system of claim 1, wherein the correlation rule defines a relationship between the first sensor data and the second sensor data.

4. The compute system of claim 1, wherein to verify whether the first sensor data is valid based on the third sensor data comprises to move the third sensor to an area occupied by the first sensor.

5. The compute system of claim 1, wherein to verify whether the first sensor data is valid based on the third sensor data comprises to move the third sensor to a location previously occupied by the first sensor.

6. The compute system of claim 1, wherein the first sensor is configured to sense a first characteristic,
wherein the sensor management circuit is further to utilize the third sensor to sense the first characteristic in place of the first sensor in response to a determination that the first sensor is malfunctioning.

7. A method for managing sensor anomalies in a compute system, the method comprising:
obtaining, by a compute device of the compute system, first sensor data from a first sensor of the compute system and second sensor data from a second sensor of the compute system;
determining, by the compute device, whether the first sensor data is anomalous based on the second sensor data and a correlation rule, wherein the correlation rule defines an expected correlation between the first sensor data and the second sensor data;
comparing, by the compute device and in response to a determination that the first sensor data is anomalous based on the second sensor data and the correlation rule, the first sensor data to a reference threshold;
determining, by the compute device, whether the first sensor is malfunctioning based on the comparison of the first sensor data to the reference threshold;
verifying, by the compute device, in response to a determination that the first sensor is not malfunctioning, whether the first sensor data is valid based on a verification rule, wherein the verification rule identifies a third sensor useable to verify whether the first sensor data is valid and wherein verifying whether the first sensor data is valid comprises verifying whether the first sensor data is valid based on a comparison of the first sensor data to third sensor data generated by the third sensor;
if the first sensor data is verified to be valid, utilizing, by the compute device, the first sensor data for standard functionality, and
if the first sensor data is not verified to be valid, utilizing, by the compute device, sensor data from another sensor in place of sensor data from the first sensor.

8. The method of claim 7, wherein obtaining first sensor data and second sensor data comprises obtaining first sensor data from a first sensor of a first sensor type and obtaining second sensor data from a second sensor of a second sensor type different from the first sensor type.

9. The method of claim 7, wherein the correlation rule defines a relationship between the first sensor data and the second sensor data.

10. The method of claim 7, wherein verifying whether the first sensor data is valid based on the third sensor data comprises moving the third sensor to an area occupied by the first sensor.

11. The method of claim 7, wherein the first sensor is configured to sense a first characteristic, and further comprising utilizing, by the compute device, a third sensor to sense the first characteristic in place of the first sensor in response to a determination that the first sensor is malfunctioning.

12. One or more non-transitory, computer-readable storage media comprising a plurality of instructions that, when executed, cause a compute device to:
obtain first sensor data from a first sensor of the compute system and second sensor data from a second sensor of the compute system;
determine whether the first sensor data is anomalous based on the second sensor data and a correlation rule, wherein the correlation rule defines an expected correlation between the first sensor data and the second sensor data;
compare, in response to a determination that the first sensor data is anomalous based on the second sensor data and the correlation rule, the first sensor data to a reference threshold;
determine whether the first sensor is malfunctioning based on the comparison of the first sensor data to the reference threshold;
verify, in response to a determination that the first sensor is not malfunctioning, whether the first sensor data is valid based on a verification rule, wherein the verification rule identifies a third sensor useable to verify the first sensor data and wherein to verify the first sensor data comprises to verify whether the first sensor data is valid based on a comparison of the first sensor data to third sensor data generated by the third sensor;
when the first sensor data is verified to be valid, utilize the first sensor data for standard functionality; and
when the first sensor data is not verified to be valid, utilize sensor data from another sensor in place of sensor data from the first sensor.

13. The one or more non-transitory, computer-readable storage media of claim 12, wherein to obtain first sensor data and second sensor data comprises to obtain first sensor data from a first sensor of a first sensor type and obtaining second sensor data from a second sensor of a second sensor type different from the first sensor type.

14. The one or more non-transitory, computer-readable storage media of claim 12, wherein the correlation rule defines a relationship between the first sensor data and the second sensor data.

15. The one or more non-transitory, computer-readable storage media of claim 12, wherein to verify whether the first sensor data is valid based on the third sensor data comprises to move the third sensor to an area occupied by the first sensor.

16. The one or more non-transitory, computer-readable storage media of claim 12, wherein the first sensor is configured to sense a first characteristic, and wherein the plurality of instructions, when executed, further cause a compute device to utilize a third sensor to sense the first characteristic in place of the first sensor in response to a determination that the first sensor is malfunctioning.

17. The compute system of claim 1, the sensor management circuit is to determine whether the first sensor is malfunctioning based on a comparison of the first sensor data to a reference threshold only in response to a determination that the first sensor data is anomalous based on the second sensor data and the correlation rule.

* * * * *